United States Patent [19]

Watari et al.

[11] Patent Number: 5,561,722
[45] Date of Patent: Oct. 1, 1996

[54] PATTERN MATCHING METHOD AND PATTERN RECOGNITION APPARATUS

[75] Inventors: Masao Watari; Miyuki Tanaka; Yasuhiko Kato, all of Kanagawa, Japan

[73] Assignee: Sony Corporation, Tokyo, Japan

[21] Appl. No.: 414,046

[22] Filed: Mar. 3, 1995

Related U.S. Application Data

[63] Continuation of Ser. No. 22,286, Feb. 25, 1993, abandoned.

[30] Foreign Application Priority Data

Mar. 4, 1992 [JP] Japan .................................. 4-082831

[51] Int. Cl.⁶ ...................................................... G06K 9/62
[52] U.S. Cl. ............................ 382/209; 382/220; 395/2.6
[58] Field of Search ..................................... 382/156, 201, 382/203, 225, 209, 220; 395/21, 24, 2, 20, 2.41, 2.54; 381/43

[56] References Cited

U.S. PATENT DOCUMENTS

| | | | |
|---|---|---|---|
| 4,414,566 | 11/1983 | Peyton et al. | 358/101 |
| 4,608,708 | 8/1986 | Watanabe | 381/43 |
| 4,665,556 | 5/1987 | Fukushima et al. | 382/41 |
| 4,802,224 | 1/1989 | Shiraki | 395/2.54 |
| 4,905,285 | 2/1990 | Allen | 395/2.11 |
| 4,910,783 | 3/1990 | Nakagawa | 381/43 |
| 4,937,871 | 6/1990 | Hattori | 381/43 |
| 5,040,133 | 8/1991 | Feintuch et al. | 382/225 |
| 5,060,279 | 10/1991 | Gawford et al. | 382/14 |
| 5,067,015 | 11/1991 | Combridge et al. | 358/133 |
| 5,109,431 | 4/1992 | Nishiya et al. | 382/30 |
| 5,138,170 | 8/1992 | Noguchi et al. | 250/461.2 |
| 5,199,543 | 4/1993 | Kamagami et al. | 194/207 |
| 5,214,717 | 5/1993 | Kimura et al. | 382/21 |
| 5,276,771 | 1/1994 | Manukian et al. | 395/24 |

FOREIGN PATENT DOCUMENTS

| | | | |
|---|---|---|---|
| 0280064 | 8/1988 | European Pat. Off. | G01L 5/06 |
| 61-017196 | 1/1986 | Japan | G10L 3/00 |
| 61-009696 | 1/1986 | Japan | G10L 3/00 |
| 61-003200 | 1/1986 | Japan | G10L 3/00 |
| 62-005299 | 1/1987 | Japan | G10L 7/08 |
| 62-105199 | 5/1987 | Japan | G10L 3/00 |
| 62-113197 | 5/1987 | Japan | G10L 3/00 |
| 63-305396 | 12/1988 | Japan | G10L 3/00 |
| 01167897 | 7/1989 | Japan | G10L 3/00 |

*Primary Examiner*—Yon J. Couso
*Attorney, Agent, or Firm*—Jay H. Maioli

[57] ABSTRACT

A pattern matching multiplies distances between an input pattern and standard patterns by distance-scale correcting weight coefficients respectively prepared for the standard patterns. This yields a distance corresponding to a category shape of a standard pattern and enhance an input pattern recognition ratio. A pattern recognition apparatus stores distance-scale correcting weight coefficients respectively prepared for all standard patterns in storage means. Distances between stored standard patterns and an input pattern generated by input pattern generating means are calculated. The calculated distance is multiplied by a weight coefficient stored in the storage means in accordance with the standard pattern used for calculating the distance from the input pattern. This structure reduces the number of templates when providing the standard patterns as multiple templates and, at the same time, enhances the input pattern recognition ratio.

3 Claims, 8 Drawing Sheets

PATTERN MATCHING METHOD AND PATTERN RECOGNITION APPARATUS

This is a continuation of application Ser. No. 08/022,286 filed Feb. 25, 1993 now abandoned.

BACKGROUND OF THE INVENTION

CROSS REFERENCE TO RELATED APPLICATION

This application is related to U.S. application Ser. No. 07/928,448, filed Aug. 12, 1992 now U.S. Pat. No. 5,355,432.

1. Field of the Invention

The present invention relates to a pattern matching method and pattern recognition apparatus to be preferably used for recognizing speech and image data.

2. Description of the Related Art

With conventional speech recognition apparatus, for example, an input speech (or an input pattern) is recognized by identifying a category of a word (or a standard pattern) to which the input speech belongs.

However, it should be noted that, even if a same word is spoken by a same speaker, a pattern of the word is not necessarily the same as that of the word spoken again by the same speaker, indicating that the category has an area more or less extending into a recognition space. For recognizing the category extended into the recognition space, a multi-template method is known, for example, in which a plurality of standard patterns are prepared for a single word.

With the conventional multi-template method, distances between an input pattern and templates (or standard patterns) are all calculated on a same distance scale, and one of the templates (or standard patterns) that is found minimizing a distance from the input pattern is regarded as a recognition result. Thus, performing pattern recognition on all templates by using the same distance scale is to determine whether a point representing an input pattern is contained in or touching one of circles (or spheres) of a same radius around a point representing a template (or a standard pattern) on a parameter plane. Therefore, enclosing neither too much nor too little, i.e., as accurately as possible, each of word categories shown in FIG. 7, for example, with circles (or spheres) having the same radius enhances recognition performance.

OBJECTS AND SUMMARY OF THE INVENTION

It is therefore an object of the present invention to provide a pattern matching method and a pattern recognition apparatus which not only enhance the pattern recognition ratio but also reduce the cost of apparatus fabrication.

According to one aspect of the present invention there is provided a pattern matching method comprising the steps of: recognizing an input pattern based on distances between said input pattern and standard patterns; and multiplying said distances by distance-scale correcting weight coefficients respectively prepared for said standard patterns.

According to another aspect of the present invention there is provided a pattern matching method comprising the steps of: entering an input pattern; storing preset standard patterns and distance-scale correcting weight coefficients respectively prepared for said standard patterns; computing distances between said input pattern and said standard patterns; and multiplying said distances by said weight coefficients according to said standard patterns to recognize said input pattern.

According to further aspect of the present invention there is provided a pattern recognition apparatus comprising: input pattern creating means for creating an input pattern; storing means for storing standard patterns and distance-scale correcting weight coefficients respectively prepared for said standard patterns; computing means for computing distances between said input pattern and said standard patterns; and recognizing means for recognizing said input pattern by said distances; wherein said computing means for computing distances multiplies said distances by said stored weight coefficients in accordance with said standard patterns.

According to a still further aspect of the present invention there is provided a pattern recognition apparatus comprising: a standard pattern storage section for storing standard patterns created beforehand; a weight coefficient storage section for storing distance-scale correcting weight coefficients respectively prepared for said standard patterns stored in said standard pattern storage section; a pattern selecting section for controlling supply of said standard patterns from said standard pattern storage section to a distance computing section and said weight coefficients from said coefficient storage section to a weight correcting section; said weight correcting section for obtaining distances for determination by multiplying distances between an input pattern entered from the distance computing section and the standard patterns by the weight coefficients stored in said weight coefficient storage section; and a distance determining section for detecting a smallest distance from among said distances for determination to output a standard pattern that minimizes a distance with the input pattern as a recognition result.

DESCRIPTION OF THE PREFERRED EMBODIMENTS

Figure 1:
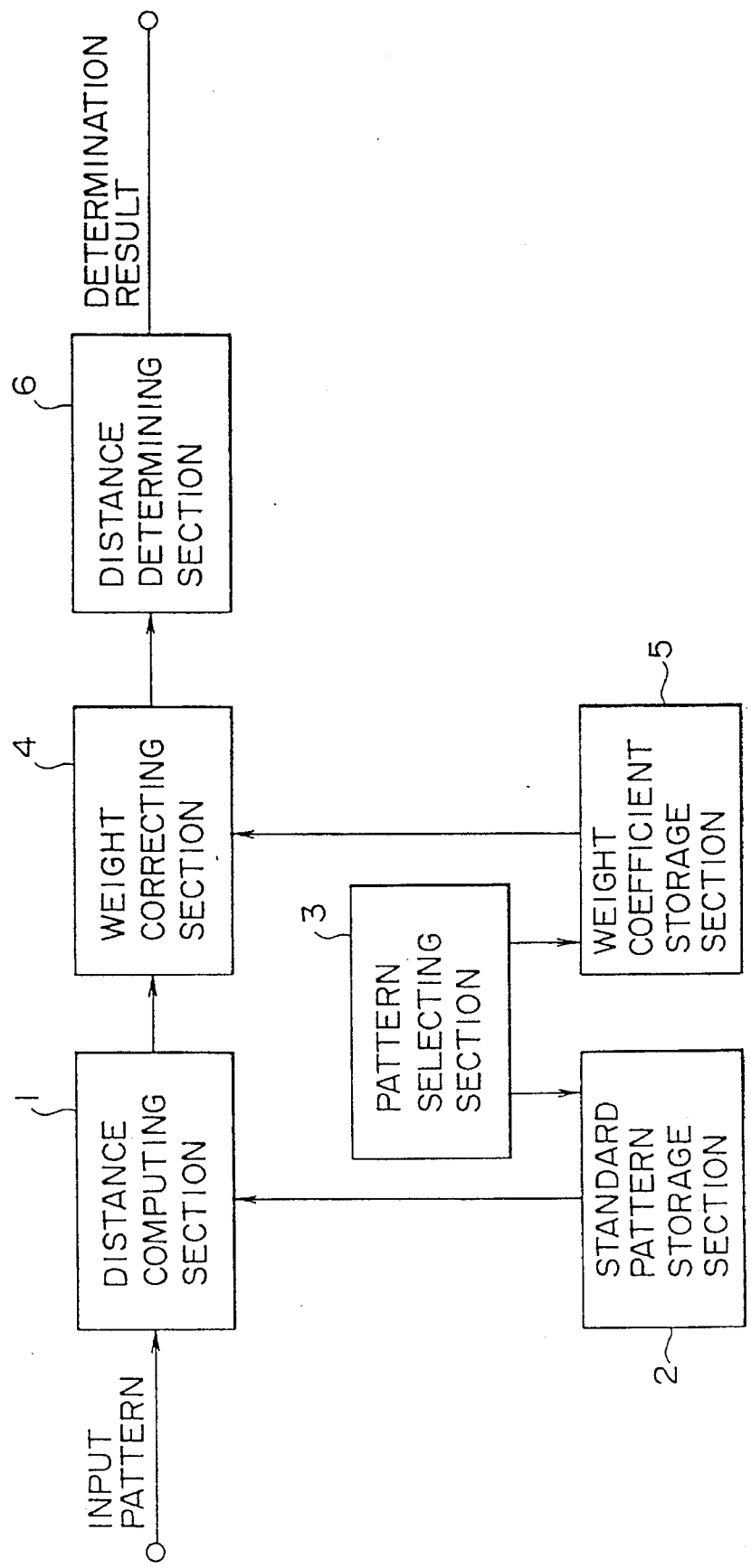
FIG. 1 is a block diagram of a constitution of an embodiment of a pattern recognition apparatus implemented by a pattern matching method according to the present invention.

FIG. 1 is a block diagram of a constitution of an embodiment of a pattern recognition apparatus implemented by a pattern matching method according to the present invention. A distance computing section 1 computes a distance (for example, a Euclidean distance) between an input pattern created from an image signal or a speech signal for example and a standard pattern (or a template) stored in the standard-pattern storage section 2. A standard-pattern storage section 2 stores standard patterns created beforehand from image or speech signals. A weight-coefficient storage section 5 stores distance-scale correcting weight coefficients respectively prepared for the standard patterns stored in the standard pattern storage section 2.

Figure 2:
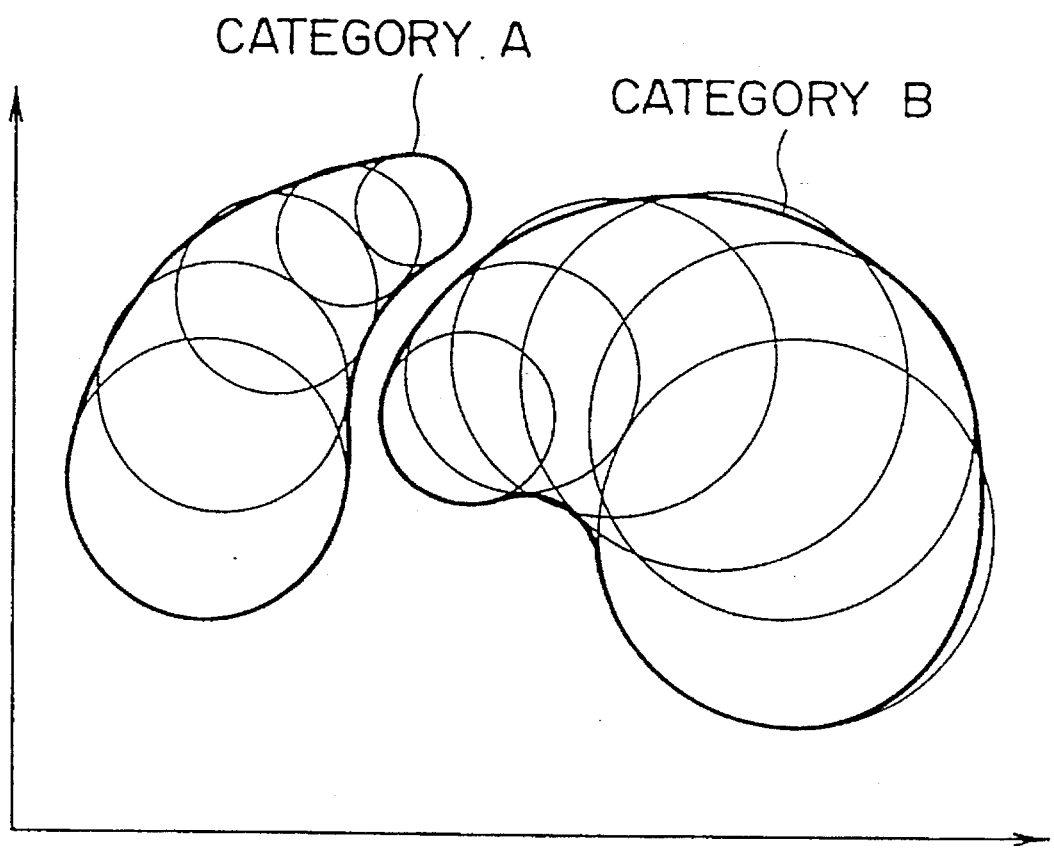
FIG. 2 is a view depicting word category shapes on a recognition plane covered, neither too much nor too little, with standard patterns (or templates) having corrected weight coefficients.

Referring to FIG. 2, a category A and a category B on a recognition plane are respectively enclosed neither to much nor too little by circles of different radii. Each of these circles on the recognition plane indicates an equidistant surface from its center, or a template (or a standard pattern). Therefore, for a template (or a standard pattern) of a relatively large radius, a weight coefficient having a relatively small value (as compared with a weight coefficient for a template of circle having a relatively small radius) is stored in the weight-coefficient storage section 5; conversely, for a template (or a standard pattern) of a relatively small radius, a weight coefficient having a relatively large value (as compared with a weight coefficient for a template of a circle having a relatively large radius) is stored in the weight-coefficient storage section 5.

A pattern selecting section 3 controls supply of standard patterns from the standard pattern storage section 2 to the distance computing section 1 and supply of weight coefficients from the weight-coefficient storage section 5 to a weight correcting section 4. The weight correcting section 4 multiplies distances between input pattern and respective standard patterns, which are supplied from the distance computing section 1 by weight coefficients stored in the weight-coefficient storage section 5. A distance determining section 6 detects a shortest distance from among those multiplied by weight coefficients and supplied from the weight correcting section 4, or distances between a corrected input pattern and respective standard patterns, outputting as a recognition result a standard pattern which minimizes a distance with the detected input pattern.

Figure 8:
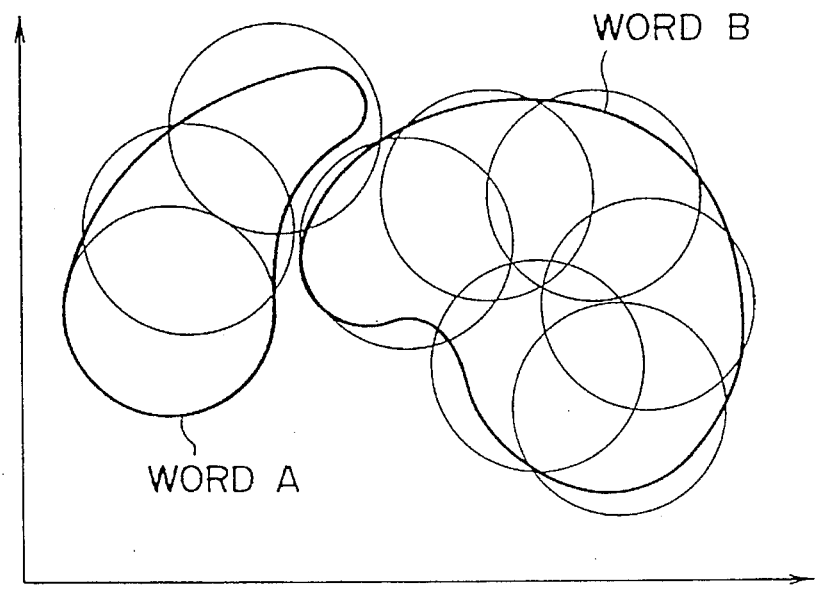
FIG. 8 is a view showing word categories covered with standard patterns (or templates) of a conventional template method.
Figure 9:
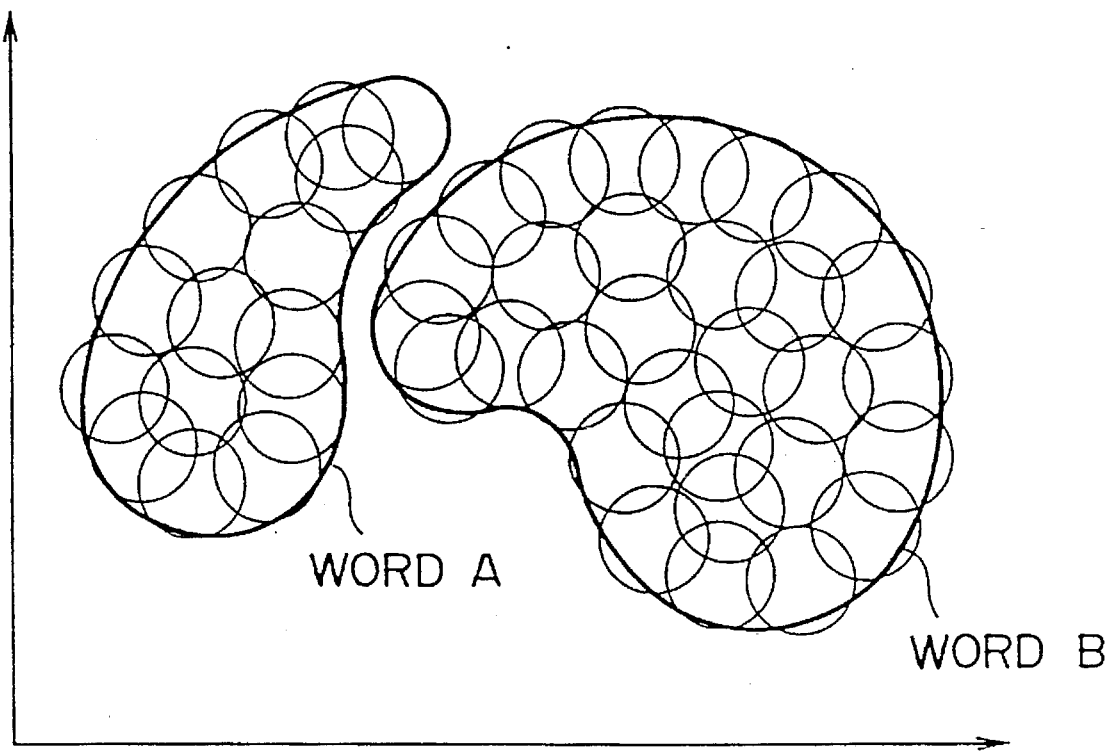
FIG. 9 is a view showing word categories covered with standard patterns (or templates) of a conventional template method.

The following describes registration of weight coefficients into the weight-coefficient storage section 5. If standard patterns (or templates) have already been entered in the standard pattern storage section 2, a relatively large weight coefficient (as compared with a weight coefficient for a standard pattern corresponding to a center of a circle not totally covering a word category) is registered in the weight-coefficient storage section 5 in the case of a standard pattern corresponding to a center of a circle getting out of a category to be recognized (for example, each of two circles enclosing top of the word-A category in FIG. 8); a relatively small weight coefficient (as compared with a weight coefficient for a standard pattern corresponding to a circle getting out of a word category) is registered in the weight coefficient storage section 5 in the case of a standard pattern corresponding to a center of a circle not totally covering a category to be recognized.

When a standard pattern is newly registered in the standard pattern storage section 2, its weight coefficient is determined so that circle around the newly registered pattern will cover a category corresponding to the standard pattern neither too much nor too little before being registered in the weight coefficient storage section 5.

Now, the embodiment operates as follows. The distance computing section 1 computes a distance (a Euclidean distance) between an input pattern created from an image signal or a speech signal for example and a standard pattern (a template) stored in the standard pattern storage section 2. The pattern selecting section 3 reads from the weight coefficient storage section 5 a distance-scale correcting weight coefficient corresponding to the standard pattern whose distance from the input pattern has been computed in the distance computing section 1. The read weight coefficient is then supplied to the weight correcting section 4. The weight correcting section 4 multiplies the distance between the input pattern and the standard pattern supplied from the distance computing section 1 by the weight coefficient supplied from the weight coefficient storage section 5 to send a result to the distance determining section 6.

It should be noted that the above-mentioned processing is performed on each of the standard patterns stored in the standard pattern storage section 2.

In the distance determining section 6, a shortest distance is selected from among those multiplied by weight coefficients, or corrected distances between the input pattern and standard patterns to output as a recognition result a standard pattern that minimizes the distance from the detected input pattern.

Thus, multiplying distances between the input pattern and standard patterns by distance-correcting weight coefficients respectively prepared for respective standard patterns allows to obtain a distance corresponding to a shape of a category of each standard pattern, enhancing a recognition ratio of input patterns.

Figure 3:
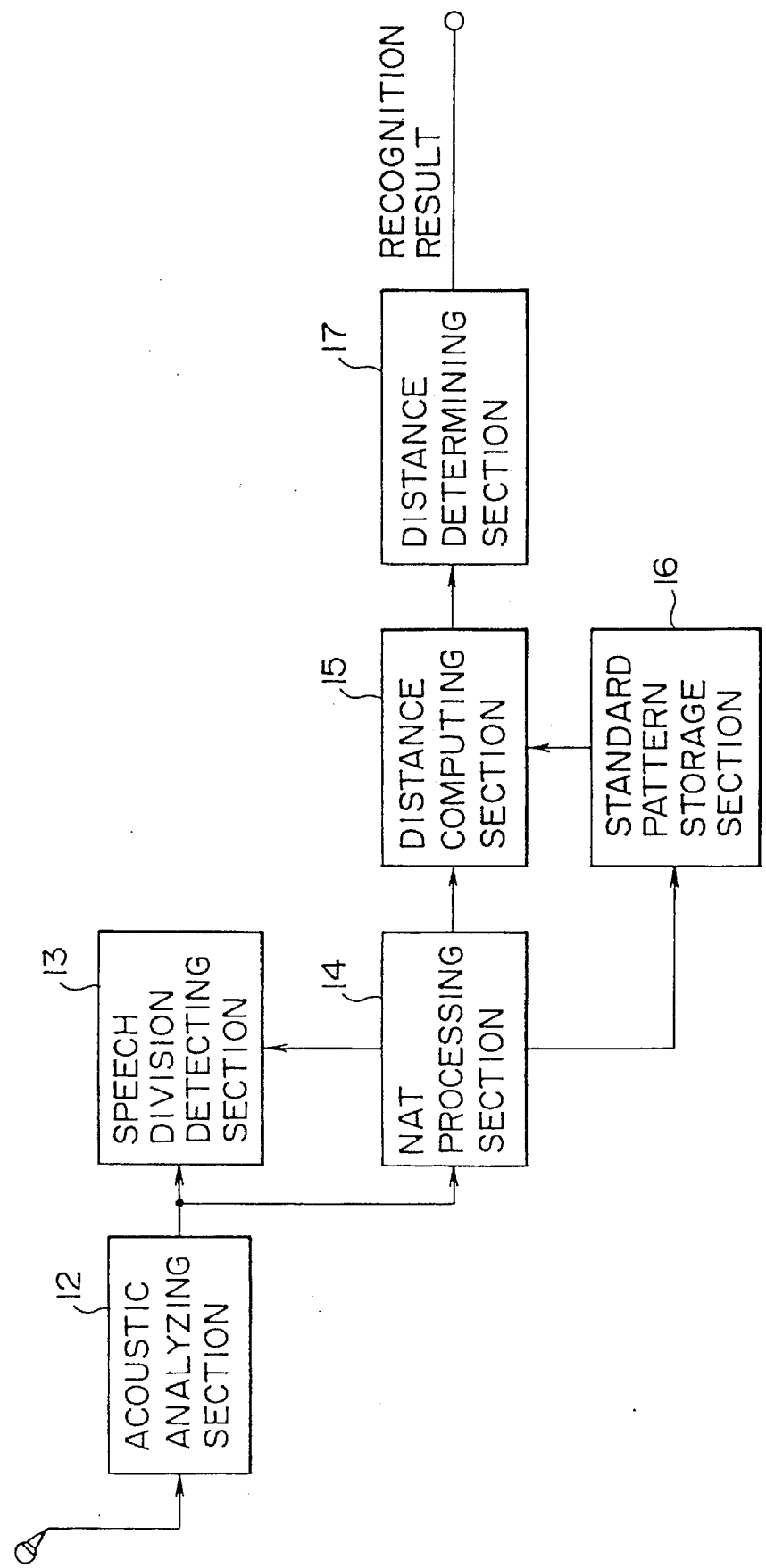
FIG. 3 is a block diagram of a constitution of an embodiment of a speech recognition apparatus based on by the pattern recognition apparatus of the present invention.

FIG. 3 is a block diagram showing a constitution of an embodiment of a speech recognition apparatus implemented by the pattern recognition apparatus according to the present invention. A microphone 11 converts an input speech into an equivalent electrical speech signal to be supplied to an acoustic analyzing section 12. The acoustic analyzing section 12 performs acoustic analysis processing on the speech signal supplied from the microphone 11 to extract a power and a zero-cross count of the speech signal and send them to a speech division detecting section 13. At the same time, the acoustic analyzing section 12 extracts a spectral characteristic (or a power) for each predetermined frequency band as a feature parameter to be supplied to a NAT (Normalization Along Trajectory) processing section (the number of frequency bands provides the number of dimensions of the feature parameter). The speech division detecting section 13 detects, from the power or zero-cross count of the speech signal coming from the acoustic analyzing section 12, a speech division of the speech signal coming from the microphone 11, or a start frame and an end frame of the speech signal, to supply a resultant signal to the NAT processing section 14.

Figure 4:
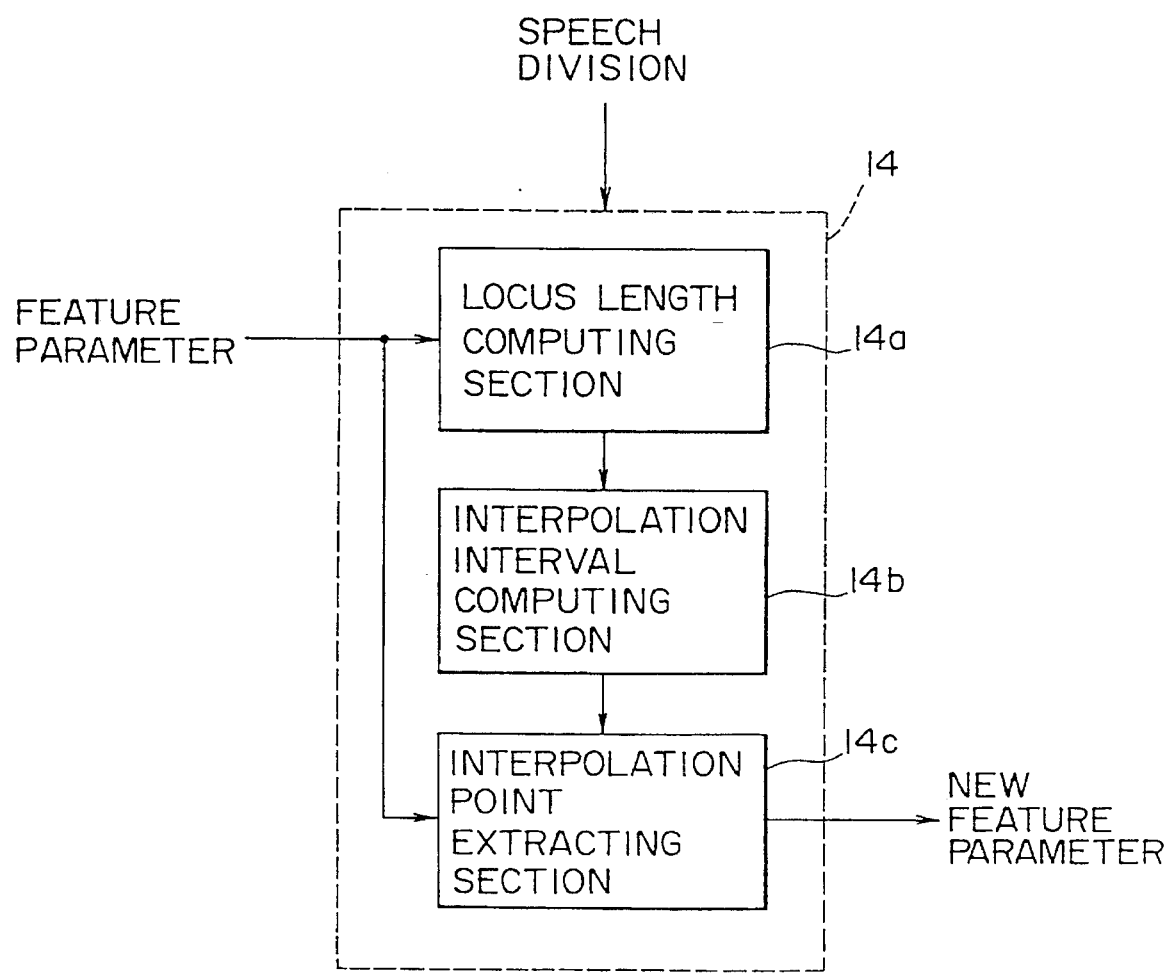
FIG. 4 is a block diagram showing details of an NAT processing section 14 of the embodiment of FIG. 3.

The NAT processing section 14 performs NAT processing as disclosed in Japanese Patent Laid-open No. 60-249198 and U.S. Pat. No. 4,972,164. Referring to FIG. 4, the NAT processing section, comprising a locus length computing unit 14a, an interpolation interval computing unit 14b, and an interpolation point extracting unit 14c, performs NAT processing on a feature parameter series supplied from the acoustic analyzing section 12 in a speech division supplied from the speech division detecting section 13. The locus length computing unit 14a of the NAT processing section 14 computes a locus length SL drawn through linear approximation by the feature parameters supplied from the acoustic analyzing section 12 in their parameter space. That is, when only two (or two dimensional) feature parameters are considered for example, the locus length computing unit 14a computes a locus length drawn by the two parameters in a two-dimensional parameter space (a two dimensional plane) as shown in FIG. 5 (a locus is indicated by dots).

The interpolation interval computing unit 14b computes an interval T (or a resampling interval T) for resampling the locus of the feature parameters drawn in the parameter space by a preset number of sampling points K and the locus length computed by the locus length computing unit 14a according to an equation below to supply a result to the interpolation point extracting unit 14c:

$$T=SL/(K-1) \quad (1)$$

Figure 5:
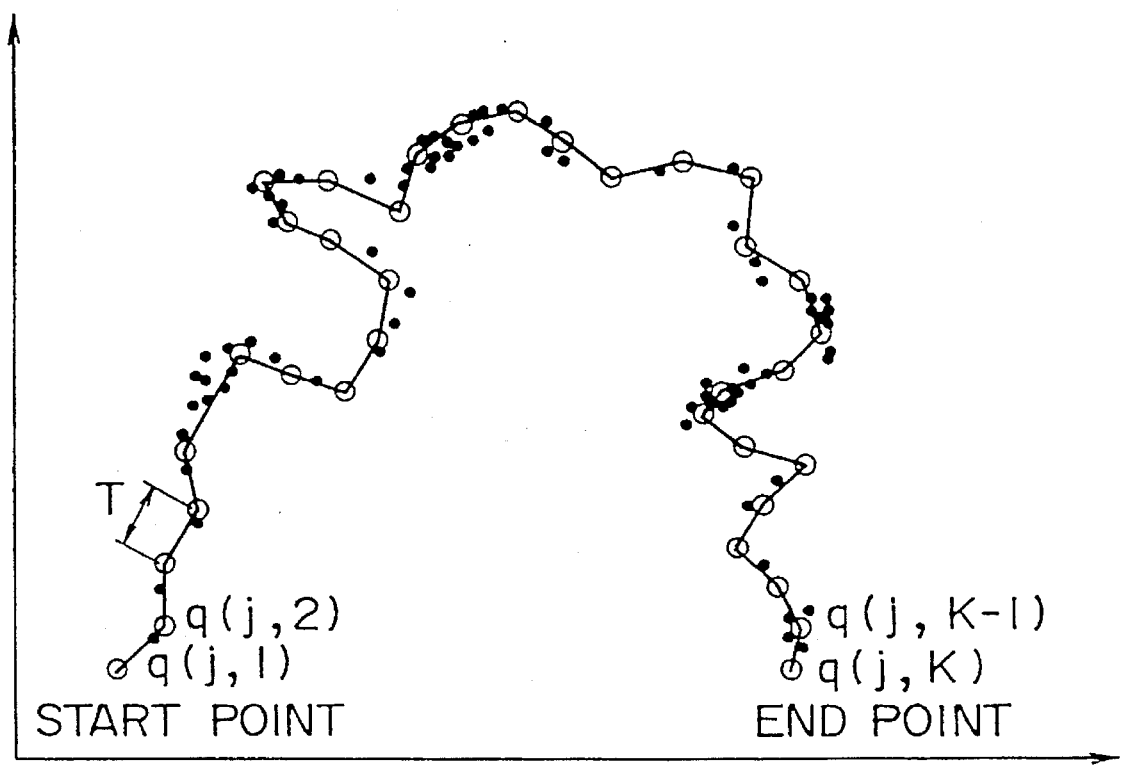
FIG. 5 is a view showing a locus of feature parameters of a speech.

The interpolation point extracting unit 14c resamples the locus of the feature parameters at the resampling interval T computed by the interpolation interval computing unit 14b, as indicated by tiny circles in FIG. 5, along the locus obtained by linearly approximating the locus drawn the by feature parameters supplied from the acoustic analyzing section 2 to compute a new feature parameter series $q(j, k)$ (j=1, 2, . . . , J: where J is the number of dimensions of feature parameters) (k=1, 2, . . . , K: K=SL/T+1) as an input pattern and supply it to the distance computing section 15.

The standard pattern storage section 16 stores weight coefficients $w_i$ for standard patterns $p_i(j, k)$ (i=1, 2, . . . , I: where I is the number of standard patterns) and standard patterns $p_i(j, k)$. The distance computing section 15 computes a distance $D_i$ between the input pattern $q(j, k)$ supplied from the NAT processing section 14 and the standard patterns $p_i(j, k)$ stored in the standard pattern storage section 16 according to a following equation:

$$D_i = \sum_{j=1}^{j} \sum_{k=1}^{k} |q(j,k) - p_i(j,k)| w_i \quad (2)$$

It should be noted that the distance computing section 15 computes the distance from the input pattern $q(j, k)$ for each of the standard patterns $p_1(j, k)$ or $p_I(j, k)$ stored in the standard pattern storage section 16.

The distance determining section 17 detects a shortest distance $D_{i(MIN)}$ from among distances $D_1$ through $D_I$ between the input pattern $q(j, k)$ and all standard patterns $p_1(j, k)$ through $p_I(j, k)$ computed by the distance computing section 15 to determine whether the shortest distance $D_{i(MIN)}$ is greater than a predetermined reference value $R_{TH}$. If the distance $D_{i(MIN)}$ is found greater than the predetermined reference value $R_{TH}$ ($D_{i(MIN)} > R_{TH}$), the distance determining section 17 determines that it could not recognize the input pattern $q(j, k)$, outputting nothing (or rejecting the input pattern $q(j, k)$).

It should be noted that the above-mentioned predetermined reference value $R_{TH}$ is hereinafter called a rejection threshold value.

If the distance determining section 17 has found that the distance $D_{i(MIN)}$ is smaller than the rejection threshold value $R_{TH}$ ($D_{i(MIN)} \leq R_{TH}$), it outputs, as a result of having recognized the input pattern $q(j, k)$, a word corresponding to the standard pattern $p_{i(MIN)}(j, k)$ which minimizes the distance from the input pattern $q(j, k)$.

Figure 6:
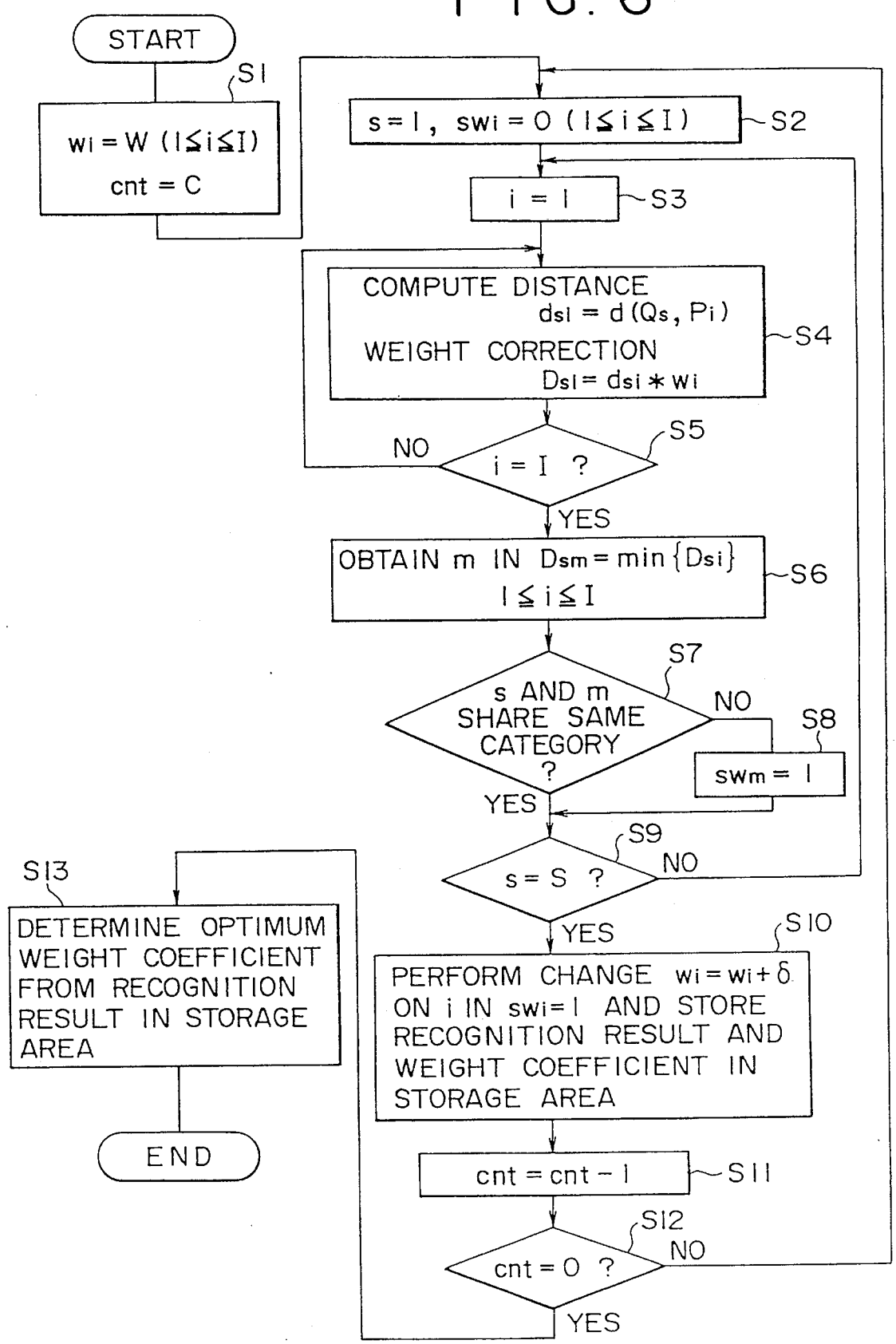
FIG. 6 is a flowchart describing by algorithm for creating weight coefficients to be stored in a standard pattern storage section 16 of the embodiment of FIG. 3.
Figure 7:
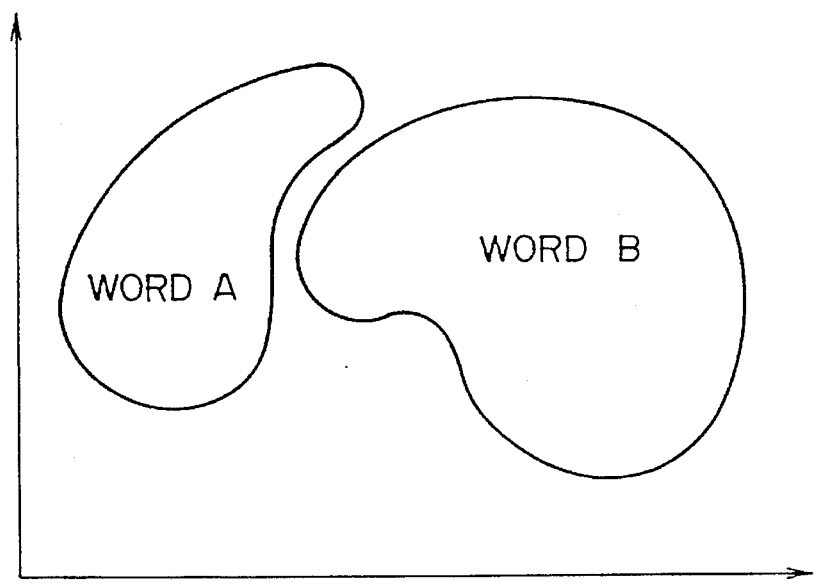
FIG. 7 is a view showing a distribution of word categories on a recognition plane.

Next, an algorithm for creating the weight coefficient $w_i$ for each of the standard patterns $p_i(j, k)$ and the standard patterns $p_I(j, k)$ will be described by referring to FIG. 6. Before a processing shown in FIG. 6 is performed, a same processing as one in which an input pattern to be described later is created (or a speech is recognized) is performed by the microphone 11, the acoustic analyzing section 12, the speech division detecting section 13, and the NAT processing section 14 to create standard patterns. It should be noted that this processing is performed on S pieces of data pronounced by an unspecified speaker for generating standard patterns to create S standard patterns $Q_s$ ($1 \leq s \leq S$).

Further, a minimum number of standard patterns required for entirely covering a category of each word to be registered as a standard pattern with circles each having, for example, the above-mentioned rejection threshold value $R_{TH}$ as its radius is selected from the S standard patterns $Q_s$ created as mentioned above (hereinafter called candidate patterns). Here, let the number of selected standard patterns be I for example, or let the selected standard patterns be $P_1$ through $P_I$ ($P_i$ ($1 \leq i \leq I$)).

In step S1 shown in FIG. 6, weight coefficients wl or wI of standard patterns $P_1$ through $P_I$ are set to an initial value W and a repeat count C for repeating a preset processing of steps S2 through S12. Then the processing goes to step S2 where a variable s which is a suffix of the candidate patterns $Q_s$ is set to one and variables $sw_i$ ($1 \leq i \leq I$) are set to zero one of which will be set to zero when updating (or correcting) the weight coefficient $w_i$ in step S8 to be described later.

Then, in step S3, a variable i which is a suffix of the standard patterns $P_i$ is set to one. In step S4, distances $d_{si}$ (d ($Q_s$, $P_i$)) between the candidate pattern $Q_s$ and the standard patterns $P_i$ are calculated and distances obtained by multiplying the distances $d_{si}$ by the respective weight coefficient $w_i$, or weight-corrected distances $D_{si}$ (=$d_{si} \times w_i$) are calculated. In step S5, it is determined whether the variable i is equal to the number of standard patterns I. If it is found not equal, the processing goes back to step S4. Steps S4 and S5 are repeated until the variable i is found equal to the number of standard patterns I.

Thus, in steps S3 through S5, weight-corrected distances ($D_{s1}$ through $D_{sI}$) are calculated with respect to a combination of I standard patterns P1 through PI and candidate pattern $Q_s$.

If the variable i is found equal to the number of standard patterns I in step S5, the processing goes to step S6 where a shortest distance $D_{sm}$ is selected from among the weight-corrected distances $D_{s1}$ through $D_{sI}$. In step S7, it is determined whether standard pattern $P_m$ which has a distance from the candidate pattern $Q_s$ which become the shortest distance $D_{ms}$ detected in step S6, which has a shortest distance from the candidate pattern $Q_s$ and the candidate pattern $Q_s$ belong to a same category.

It should be noted that the standard patterns $P_1$ through $P_I$ are the minimum number of patterns selected from among the candidate patterns $Q_1$ through $Q_s$, and required for entirely covering a category of each word to be registered as a standard pattern with circles having the rejection threshold value $R_{TH}$ as their radii. Therefore, the standard pattern $P_m$ which has a distance from the candidate pattern $Q_s$ which become the shortest distance $D_{sm}$ and the candidate pattern $Q_s$ should belong to the same category. If it has been determined in step S7 that the standard pattern $P_m$ and the candidate pattern $Q_s$ do not belong to the same category, or the candidate pattern $Q_s$ has not been recognized as the standard pattern $P_m$, the candidate pattern $Q_s$ has been recognized erroneously.

Consequently, if it has been determined in step S7 that the standard pattern $P_m$ and the candidate pattern $Q_s$ do not belong to the same category, the processing goes to step S8 where one is set to the variable $sw_i$ to correct the weight coefficient $w_i$ so that the erroneously recognized candidate pattern $Q_s$ is recognized as the standard pattern $P_m$. Then, the processing goes to step S9. If, on the other hand, the standard pattern $P_m$ and the candidate pattern $Q_s$ have been found belonging to the same category in step S7, the processing skips step 8 and goes directly to step S9.

In step S9, it is determined whether the variable s which is the suffix of the candidate pattern $Q_s$ is equal to the number of candidate patterns S. If it is not found equal, the processing goes back to step S3. Steps S3 through S9 are repeated until the variable s is found equal to the number of candidate patterns S.

If the variable s which is the suffix of the candidate pattern $Q_s$ is found equal to the number of candidate patterns S, the processing goes to step S10 where the weight coefficient $w_i$ whose suffix is the i of the variable $sw_i$ which was set t one in step S8 is updated (or corrected) according to a following equation:

$$w_i = w_i + \delta \quad (3)$$

where, $\delta$ is sufficiently smaller than W.

Further, in step S10, the result of determination whether the standard pattern $P_m$ and the candidate pattern $Q_s$ belong to the same category as processed in step S7, or the recognition result of the candidate pattern $Q_s$ is stored in a predetermined storage area along with the weight coefficient $w_i$. Then, the processing goes to step S11 where the variable cnt is decremented by one. The processing further goes to step S12 where it is determined whether the variable cnt is equal to zero or not. If the variable cnt is found unequal to zero, the processing goes back to step S2. Steps S2 or S12 are repeated until the variable cnt is found equal to zero.

When the variable cnt is found equal to zero in step S12, the processing goes to step S13 where the recognition result stored in step S10 is referenced to determine that the one of the weight coefficients $w_1$ through $w_I$ which is at a highest recognition ratio for example is a final weight coefficient, upon which the processing comes to an end.

Thus, the weight coefficient is determined, which encloses, neither too much nor too little, the category A or B with circles as a word on the recognition plane as shown in FIG. 2.

Operations of speech recognition will be described as follows. A speech entered in the microphone 11 is converted into an equivalent electrical speech signal to be supplied to the acoustic analyzing section 12. In the acoustic analyzing section 12, acoustic analysis processing is performed on the speech signal supplied from the microphone 11 to extract the power and zero-cross count of the speech signal which are supplied to the speech division detecting section 13 and, at the same time, extract a spectral characteristic (power) for each predetermined frequency band as feature parameters which are supplied to the NAT processing section 14. In the speech division detecting section 13, the speech division, or the start frame and end frame of the speech signal supplied from the acoustic analyzing section 12, are detected from the power or zero-cross count of the speech signal supplied from the acoustic analyzing section to be supplied to the NAT processing section 14.

In the NAT processing section 14, NAT processing is performed on the feature parameter series supplied from the acoustic analyzing section 12 in the speech division supplied from the speech division detecting section 13. That is, the locus length computing unit 14a of the NAT processing section 14 calculates the length SL of the locus drawn by the feature parameters supplied from the acoustic analyzing section 12 in their parameter space through linear approximation. In the interpolation interval computing unit 14b, the interval (or the resampling interval) T for resampling the locus of the feature parameters drawn in the parameter space is calculated from the preset number of sampling points K and the locus length SL supplied from the locus length computing unit 14a according to the equation (1) to be supplied to the interpolation point extracting unit 14c.

The interpolation point extracting unit 14c resamples the locus of the feature parameters as indicated by tiny circles in FIG. 5 along the locus drawn by the feature parameters supplied from the acoustic analyzing section 2 through linear approximation at the resampling interval T calculated by the interpolation interval computing unit 14b, providing a new feature parameter series as an input pattern.

The distance computing section 15 computes the distances $D_i$ between the input pattern q(j, k) supplied from the NAT processing section 14 and the standard patterns $p_i$(j, k) stored in the standard pattern storage section 16 according to the equation (2) by multiplying the distance-scale correcting weight coefficient $w_i$ prepared for each of the standard patterns $p_i$(j, k) by the simple distance between the input pattern q(j, k) and the standard patterns $p_i$(j, k).

It should be noted that the distance computing section 15 computes the distances from the input pattern q(j, k) for each of the standard patterns $p_1$(j, k) through $p_I$(j, k) stored in standard pattern storage section 16.

The distance determining section 17 detects the shortest distance $D_{i(MIN)}$ from among the distances $D_I$ through $D_I$ between the input pattern q(j, k) and all standard patterns $p_1$(j, k) through $p_I$(j, k) to determine whether the distance $D_{i(MIN)}$ is greater than the rejection threshold value $R_{TH}$ or not. If the distance $D_{i(MIN)}$ is found greater than the rejection threshold value $R_{TH}$ ($D_{i(MIN)} > R_{TH}$), the input pattern q (j, k) is rejected as not having been recognized. If the distance $D_{i(MIN)}$ is found equal to or smaller than the rejection threshold value $R_{TH}$ ($D_{i(MIN)} - R_{TH}$), a word corresponding to the standard pattern $p_i$(MIN) which minimizes the distance from the input pattern q(j, k) is outputted as a result of a successful recognition of the input pattern q(j, k).

As described above, the distances between the input pattern and standard patterns are multiplied by distance-scale correcting weight coefficients respectively prepared for the standard patterns to obtain a distance corresponding to a category of a standard pattern, thereby enhancing a speech recognition ratio.

Although, in the embodiment of the present invention, I standard patterns are selected from among given S candidate patterns to update (or correct) weight coefficients for these I standard patterns to adapt them to a shape of a word category, determining the weight coefficients (corresponding to the centers and radii of the circles covering the category A or B in FIG. 2 for example) according to a category shape along with the standard patterns (or templates) may reduce the number of the standard patterns (or templates).

While preferred embodiments of the invention have been described using specific terms, such description is for illustrative purpose only, and it is to be understood that changes and variations may be made without departing from the spirit or scope of the appended claims.

What is claimed is:

1. A pattern recognition apparatus comprising:

input pattern creating means for creating an input pattern;

storing means for storing standard patterns of different radii and distance-scale correcting weight coefficients respectively prepared for said standard patterns, for each one of said standard patterns a product of a corresponding weight coefficient and a corresponding radius of the standard pattern being equal to a predetermined threshold value such that a first radius having a corresponding first weight coefficient is larger than a second radius of a second weight coefficient having a value that is larger than a value of said first weight coefficient;

distance computing means for computing distances between said respective standard patterns and said input pattern, and for computing weight-corrected distances by multiplying said computed distances between said respective standard patterns and said input pattern by said stored weight coefficients of said respective standard patterns; and recognizing means for recognizing said input pattern by selecting one of said standard patterns which has a shortest weight-corrected distance from said input pattern and comparing the shortest weight-corrected distance to said predetermined threshold value.

2. A pattern recognition apparatus comprising:

a standard pattern storage section for storing standard patterns of different radii;

a weight coefficient storage section for storing distance-scale correcting weight coefficients respectively prepared for said standard patterns stored in said standard pattern storage section, for each one of said standard patterns a product of a corresponding weight coefficient and a corresponding radius of the standard pattern being equal to a predetermined threshold value such that a first radius having a corresponding first weight coefficient is larger than a second radius of a second weight coefficient having a value that is larger than a value of said first weight coefficient;

a distance computing section for computing distances between respective standard patterns and an input pattern;

a weight correcting section for obtaining weight-corrected distances by multiplying said computed distances between said respective standard patterns and said input pattern by said weight coefficients of said respective standard patterns which are stored in said weight coefficient storage section;

a pattern selecting section for controlling supply of said standard patterns from said standard pattern storage section to said distance computing section and said weight coefficients from said weight coefficient storage section to said weight correcting section; and a distance determining section responsive to said weight correcting section for detecting a smallest distance from among said weight-corrected distances, and for comparing the detected smallest distance to said threshold value, a standard pattern corresponding to the detected smallest distance which conforms as closely as possible to said input pattern being supplied as a recognition result if the detected smallest distance is less than or equal to said threshold value.

3. A pattern recognition apparatus as defined in claim 2 wherein said distances between said respective standard patterns and said input pattern are euclidean.

* * * * *